United States Patent [19]
Wang et al.

[11] 3,964,587
[45] June 22, 1976

[54] CONTROL VALVE FOR A WET CLUTCH

[75] Inventors: Ting M. Wang, Warren, Mich.; Walter H. Richardson, deceased, late of Sterling Heights, Mich.; by Gregory R. Richardson, administrator, Mount Clemens, Mich.

[73] Assignee: Borg-Warner Corporation, Chicago, Ill.

[22] Filed: Aug. 2, 1973

[21] Appl. No.: 385,029

[52] U.S. Cl. ................ 192/113 B; 188/264 P
[51] Int. Cl.² ............................. F16D 13/72
[58] Field of Search ........... 192/113 B; 188/264 D, 188/264 E, 264 P

[56] References Cited
UNITED STATES PATENTS 2,220,824  11/1940  Olcott ................... 192/113 B X
3,610,384  10/1971  Borck ..................... 192/113 B X
3,768,613  10/1973  Brunner .................. 192/113 B X Primary Examiner—Benjamin W. Wyche
Attorney, Agent, or Firm—James A. Geppert

[57] ABSTRACT

A control valve for the liquid reservoir of a liquid cooled friction clutch wherein the liquid in the clutch is circulated by a pitot tube pump in the cover plate assembly through a cooler and then to a fluid reservoir where the valve controls flow therefrom directed to and across the friction facings of a driven member. The valve in the reservoir is pressure operated to control the outlet for and automatically upon stoppage of the pump dumps the overfill of the reservoir to the clutch to prime the clutch and initiate circulation of the fluid to the pump upon a subsequent start-up of the vehicle.

22 Claims, 4 Drawing Figures

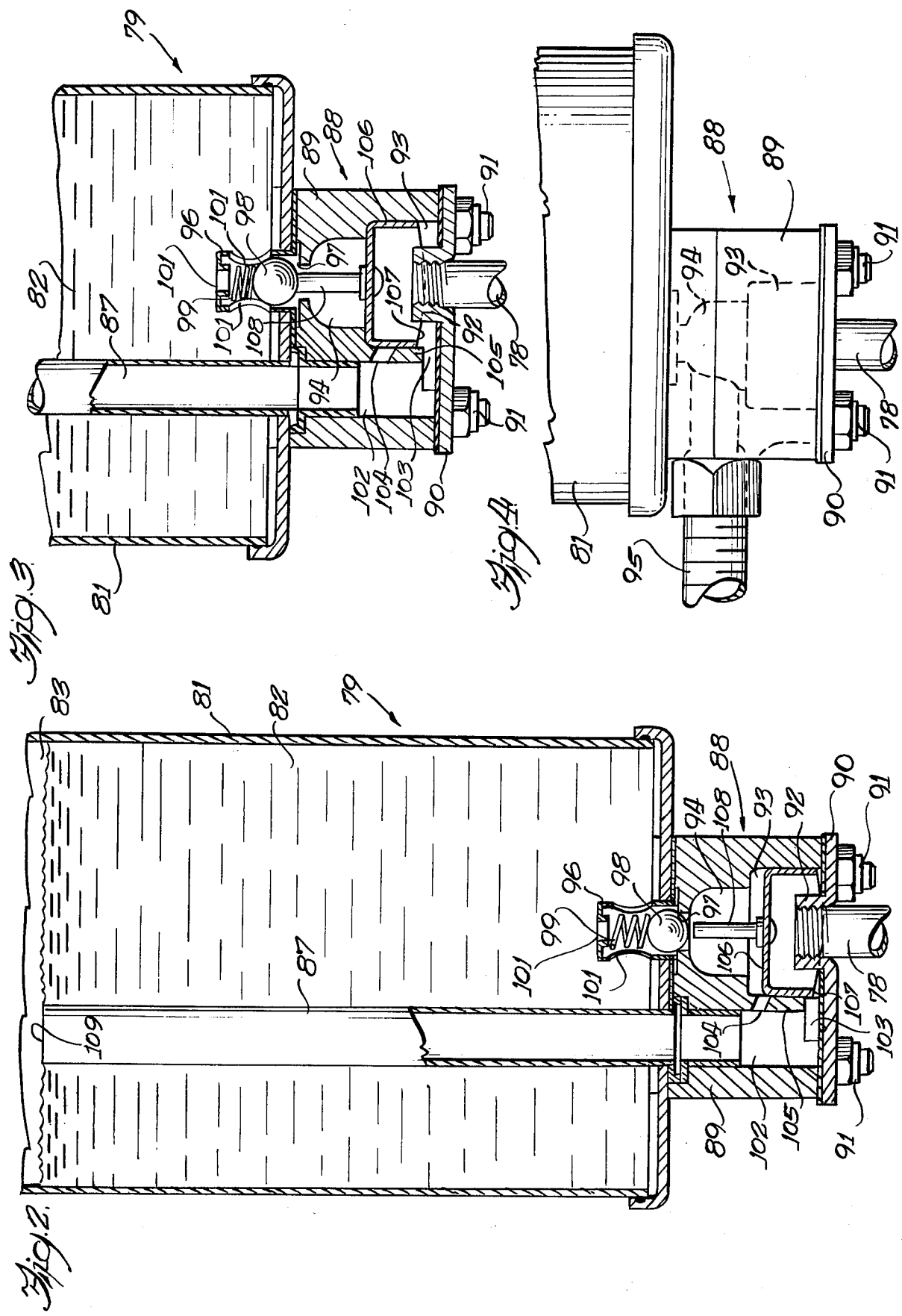

CONTROL VALVE FOR A WET CLUTCH

SUMMARY OF THE INVENTION

The present invention relates to wet clutch systems and more particularly to a wet clutch system of the dry housing type wherein fluid is pumped from the clutch through a cooler and into a fluid reservoir controlled by a valve for return flow to the clutch.

With conventional clutches, the generation of heat under heavy-duty operations soon results in severely limited clutch life due to break down of the clutch facing. Ventilating the clutch housing and increasing the axle ratio will increase the clutch life, but not to an acceptable level. A wet clutch utilizes an oil circulating and cooling system which keeps the friction surfaces constantly bathed in cooling oil to carry off the heat generated during clutch operation. This cooling arrangement will result in an increased clutch life of from 10 to 100 times over conventional dry clutches.

However, even wet clutches are not without problems. The use of a wet clutch requires the sealing of the clutch and flywheel housing, and a power loss may be experienced when a positive displacement pump is utilized where output is proportional to engine speed. If the system is set up to provide sufficient cooling fluid at idling speeds, then the flow at high engine speeds is far in excess of that required for use, thus requiring additional expenditure of energy by the engine.

The present invention obviates these problems by providing a clutch system where all the clutch components, release mechanism and circulating pump are confined in a single enclosure which is attached and sealed on the flywheel. Also, the assembly incorporates a simple non-rotating ram tube pump attached to the release carrier which, with appropriate valving, regulates the system flow to a rate for proper cooling of the clutch in the service environment intended and no more. This arrangement provides sufficient cooling and reduces power loss at high speeds, and several embodiments of the basic cooling system are shown in the Howard O. Borck U.S. Pat. No. 3,610,384.

The present invention is an improvement over the systems shown in the above-mentioned patent in providing a fluid reservoir with a novel control valve, therein utilized to control the flow of cooling fluid during operation of the clutch and prime the clutch for circulation at start-up.

An important object of the present invention is the provision of a fluid reservoir having a novel control valve in the circulation path for cooling fluid for the clutch assembly which is inserted in the circulation path after a fluid cooler.

Another object of the present invention is the provision of a fluid reservoir having a novel control valve that is actuated by inlet pressure at the fluid reservoir, where the valve is a check valve actuated by a projection on an actuation member that is acted upon by the inlet fluid pressure.

A further object of the present invention is the provision of a fluid reservoir having a piston at the inlet thereof with a by-pass opening to a standpipe for the reservoir to allow fluid flow at pressures below that required to actuate the control valve. The standpipe is so arranged in the reservoir to automatically dump the overfill thereof when the engine is stopped and provide priming of the clutch and pump so that upon engine start-up, the pump is enabled to initiate circulation of the cooling fluid.

Further objects are to provide a construction of maximum simplicity, efficiency, economy and ease of assembly and operation, and such further objects, advantages and capabilities as will later more fully appear and are inherently possessed thereby.

DESCRIPTION OF THE DRAWINGS

FIG. 2 is an enlarged partial vertical cross sectional view of the fluid reservoir and control valve prior to engine start-up.

FIG. 3 is an enlarged partial vertical cross sectional view similar to FIG. 2 but showing the valve components in their position of pressure fluid flow.

FIG. 4 is a partial side elevational view of the fluid reservoir taken from a position rotated 90° from the view of FIGS. 2 and 3.

DESCRIPTION OF THE PREFERRED EMBODIMENT

Figure 1:
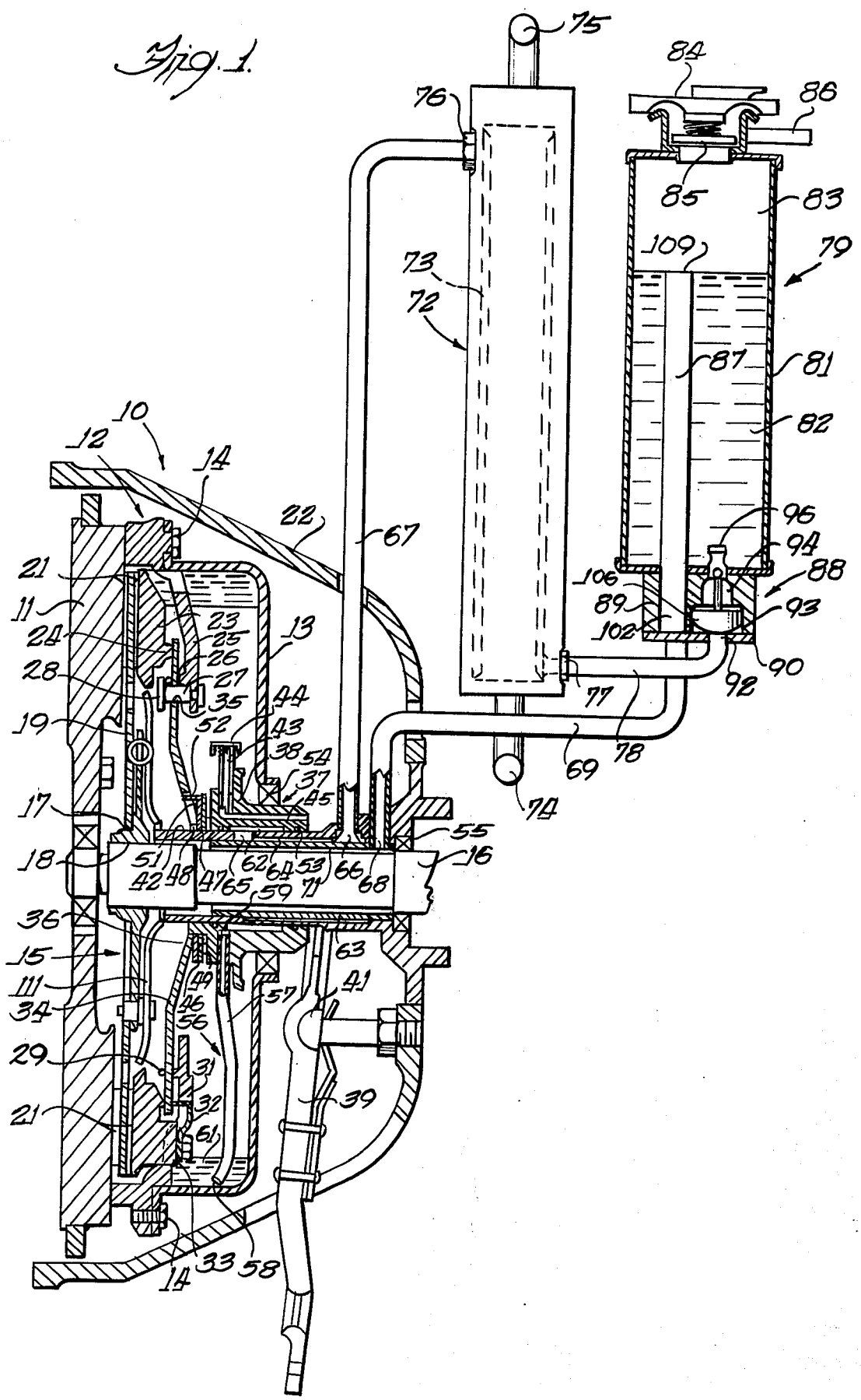
FIG. 1 is a side elevational view partially in vertical cross section of a clutch assembly, fluid cooler and fluid reservoir.

Referring more particularly to the disclosure in the drawings wherein is shown an illustrative embodiment of the present invention, FIG. 1 discloses a liquid cooled clutch assembly 10 which includes a rotary driving member or flywheel 11 adapted to be connected to a prime mover (not shown) and secured to a fluid-tight cover assembly 12 including a cover plate 13 secured by suitable means, such as bolts 14, to the flywheel forming a sealed rotatable chamber. A driven member 15 is splined to an output shaft 16 to rotate therewith; the driven member including an annular hub section 17 with internal splines 18, a radially outwardly extending disc 19 carried on the hub section 17 and a pair of grooved friction surfaces 21, one positioned on each side of the disc 19. The driving and driven members are enclosed by a housing 22 of the dry-sump type.

A pressure plate 23, coaxial with the output shaft 16, is adapted to move axially in either direction to urge the driven member 15 into and out of engagement with the driving member 11. The pressure plate 23 includes an integral annular rib 24, and the cover plate assembly 12 includes a fulcrum plate 25 mounted in the cover plate 12 and rigidly fixed thereto. The fulcrum plate 25 includes an integral annular rib 26 and a plurality of shoulder rivets 27 secured to the plate 25; the rivets 27 including enlarged heads 28 supporting a round wire hoop 29.

A plurality of openings 31 are formed in the plate 25 to receive a plurality of spring clips 32 bolted to the pressure plate 23; which clips protrude through the openings 31 to retract the pressure plate upon clutch release. Lugs 33 on the pressure plate 23 slidably engage the openings 31 to form the driving connection between the cover plate assembly 12 and the pressure plate 23. Resilient means, such as the diaphragm spring 34, is positioned adjacent its periphery between the rib 26 of the fulcrum plate 25 and the rib 24 of the pressure plate 23, and a plurality of openings 35 are formed in the spring 34 through which project the shoulder rivets 27.

The integral rib 26 serves as a reaction member for the diaphragm spring 34 transmitting the spring load to the rib 24 on the pressure plate 23 and thus applying a clamping load on the driven member 16 between the pressure plate 23 and the flywheel 11 to engage the clutch. The diaphragm spring 34 is provided with disengaging fingers 36 bent axially outwardly and away from the pressure plate to provide centrifugal assist to the engaging force of the spring acting on the pressure plate.

Clutch releasing means 37 includes a non-rotatable release carrier 38 actuated by a fork 39 pivoted on a ball stud 41 which is mounted on the clutch housing 22. The release carrier 38 is engaged with the fork 39 and is adapted to move forward and backward axially on a support member 42 carried by the housing 22 to release and re-engage the clutch. A vent tube 43 is pressed into the release carrier 38 near the top and has its outermost end notched and covered by an inverted cup 44. The vent 43 communicates with a passage 45 in the carrier to the exterior of the housing and acts to equalize the pressure between the inside of the cover plate 13 and the outside. Also, the cup 44 prevents the loss of fluid when the engine stops and fluid drops from the top to the bottom of the clutch.

A non-rotating thrust washer 46 is operatively connected to the release carrier 38 by internal tangs 47 and slots 48 and backed by a shoulder 49 on the carrier. The washer is faced with suitable bearing material or a bearing washer and engages a steel plate 51 mounted by tangs 52 to slots formed between the disengaging fingers 36 of the diaphragm spring 34. Seals 53 are provided between the release carrier 38 and the support member 42 to prevent fluid from escaping from the carrier and to insure a fluid-tight sealed chamber. A clutch over seal 54 is fixed in the cover plate 13 rotatable about the circumference of the release carrier to prevent fluid from leaking out of the sealed rotatable chamber. A support member seal 55 is carried by the support member 42 to contact the output shaft 16 and seal the outer end of the support member.

Pumping means 56 in the form of a pitot tube pump is located inside the cover plate 13. The pump comprises one or more tubes 57 connected to the carrier 38 and each formed with an inlet end 58 and an outlet end 59 fixed in the carrier. The tubes are curved and flattened and sharpened at the inlet ends 58 to efficiently receive the fluid and are positioned such that each open end 58 faces opposite to the direction of rotation of the cover plate 13. The cooling fluid, due to the centrifugal force imparted to it by the rotating cover plate assembly 12, forms an annular band 61 on the inner periphery of the cover plate 13, and the inertia of the rotating fluid causes the fluid to flow into the tube inlets 58 under pressure where it then flows to the outlet ends 59 of the tube pump 56.

A fluid circuit for the clutch assembly includes an annular fluid chamber 62 formed in the release carrier 38 and communicating with the outlet ends 59 of the tube pump 56. An inner sleeve member 63, coaxial with the support member 42, is in contact with the support member at its inner diameter to define a chamber 64 therebetween. One or more ports 65 are defined in the support member 42 to connect the fluid chamber 62 with the chamber 64. A port 66 is formed in the support member 42 communicating between the chamber 64 and a first fluid conduit 67. Also, a port 68 is formed in the inner sleeve member 63 and communicates between a second fluid conduit 69 and a fluid chamber 71 defined between the output shaft 16 and the inner sleeve member 63.

A liquid cooler 72 is shown as a tubular tank through which cooling water flows and in which is submerged a common tubular type oil cooler element 73. The cooler 72 has a cooling water inlet 74 at one end and a cooling water outlet 75 at the opposite end; the cooling water flowing countercurrent to the flow of oil. The first fluid conduit 67 connects the port 68 to a fluid inlet 76 for the liquid coler. An outlet 77 is positioned adjacent the lower end of the cooler 72 and a fluid conduit 78 leads from the outlet 77 to a control valve and fluid reservoir assembly 79.

The assembly 79 includes a fluid reservoir 81 for a predetermined quantity of cooling fluid 82 with an air cavity 83 above the surface of the fluid. Pressure relief for the reservoir is provided by means of a reservoir filler cap 84 of conventional design having a spring-biased valve 85 allowing pressure relief through a side conduit 86; the cap also having a built-in vacuum relief valve. A standpipe 87 extends upward from a control valve 88 to define at its upper end 109 the static fluid level for the cooling fluid 82.

The control valve 88 includes a valve housing or body 89 suitably secured to the lower end of the reservoir 81, which body is provided with a sealing plate 90 secured by bolts 91 and defining a fluid inlet 92 communicating with the fluid conduit 78 and opening into the underside of a piston in a piston chamber 93. The chamber narrows at its upper end to define an outlet cavity 94 communicating with a laterally extending fluid outlet 95 (See FIG. 4) and with a valve cage 96 leading to the fluid reservoir 81. The cage is provided at its lower end with a valve seat 97 for a ball valve 98 biased downward by a spring 99. The cage has openings 101 leading to the reservoir.

A passage 102 paralleling the piston chamber 93 leads to the standpipe 87 and communicates with the chamber 93 by an opening 103 at the lower end of the body 89 and by a downwardly slanting by-pass orifice 104 spaced above the opening 103 in the wall 105 separating the chamber 93 and the passage 102. A piston 106 in the form of an inverted cup has a lower edge 107 of a configuration providing an opening, when the piston is in its lowermost position, leading to the opening 103 and passage 102, and an extension or rod 108 projects from the upper end of the piston into the outlet cavity 94 to actuate the ball valve 98. The lateral fluid outlet 95 communicates with the second fluid conduit 69 leading to the chamber 71.

Considering the operation of this assembly, with the prime mover at rest, the control valve and reservoir assembly 79 is in the position shown in FIG. 2 of the drawings with the piston 106 at its lowermost position and the ball valve 98 resting on the valve seat 97 to block communication from the reservoir 81 to the clutch. Sufficient fluid previously obtained from the reservoir, as will later be described, is present in the clutch cover plate assembly 12 to provide for initial priming of the system.

Upon energization of the prime mover, the driving member 11 will rotate carrying with it the cover plate assembly 12. The cooling fluid which has accumulated in the bottom of the cover plate assembly will be acted upon by centrifugal force imparted to it by rotation of the cover plate assembly and will form an annular band 61 of cooling fluid on the inner periphery of the cover plate 13 in the sealed rotatable chamber. The cooling fluid is forced into the inlet ends 58 of the non-rotating tube pump 56 which are positioned in the path of the rotating fluid. The fluid flows under pressure to the outlet ends 59 of the pump 56 through the fluid chamber 62 and the port 65 leading to the chamber 64. From the chamber 64, the fluid exits through port 66 and the first fluid conduit 67 to the inlet port 76 of the cooler 72. The cooling water enters the cooler 72 through inlet 74 and exits through outlet 75 and cools the fluid passing downward through the cooler element 73 which exits through the outlet 77 and the conduit 78.

The piston 106 is arranged to be actuated at a predetermined pressure; for example, approximately 1.0 pounds per square inch (psi). While the liquid flow to the underside of the piston 106 is below 1.0 psi., the fluid flows past the back edge 107 of the piston 106, through the opening 103 and up through the passage 102 and the standpipe 87 into the reservoir 81. The size of the opening at the back edge 107 of the piston 106 acts to control the rate of pressure build-up in the pressure side of piston chamber 93. A small amount of fluid also passes from the passage 102 through the orifice 104 into the outlet cavity 94 to return to the clutch.

As the pressure increases above the predetermined value of 1.0 psi, the piston 106 moves upward in the chamber 93 causing the rod 108 to contact and unseat the ball valve 98 from the valve seat 97 against the preset force of the spring 99, thus allowing flow of reservoir fluid 82 through the openings 101 in the cage 96 into the outlet cavity 94 and the clutch circulating system. Movement of the piston 106 upwardly closes the orifice 104 so that all flow of fluid is through the opening 103 and the standpipe 87 into the reservoir 81.

During normal operation, the level of fluid 82 in the reservoir 81 rises above the end 109 of the standpipe 87 into the air cavity 83. As pressure increases in the air cavity, pressure relief is provided through the reservoir filler cap 84 and side conduit 86. Fluid circulating from the reservoir 81 and fluid outlet 95 passes through the second fluid conduit 69 and the port 68 into the fluid chamber 71. Fluid flows from chamber 71 along the output shaft 16 to an annular collector plate 111, shown attached to the driven member 15, where it is radially dispersed to flow across the friction surfaces 21 and dissipate heat generated by the friction drive. Then, the fluid is carried by the cover plate assembly 12 to merge into the annular band 61 as previously described.

At the end of the flow cycle with the engine stopped, as the flow decreases to a pressure below 1.0 psi at the inlet port 92, the piston 106 returns to its lowermost position and the ball valve 98 reseats on the valve seat 97 and stops fluid flow through the cage 96 from the bottom of the reservoir 81. All fluid remaining in the reservoir above the end 109 of the standpipe 87 enters the standpipe and flows downward through the orifice 104 to the outlet cavity 94 and also backward through the opening 103 to the inlet port 92 to the clutch system until the fluid level reaches the end 109 of the standpipe 87 as shown in FIG. 2. As the fluid level drops the vacuum relief valve (not shown) in the filler cap 84 allows air to re-enter the air cavity 83 and the total assembly is ready for restart; the fluid returning to the clutch from the reservoir provided priming for the pump 56.

The orifice 104 insures the bleed-off of priming fluid regardless of the relative vertical position of the reservoir 81 to the cooler 72 in the vehicle. Thus with the cooler 72 located between the clutch outlet and reservoir inlet and mounted above the reservoir 81, the orifice 104 would still allow fluid to drain back to the clutch via the outlet chamber 94 and lateral fluid outlet 95 of the valve to the second fluid conduit 69.

This cycle repeats itself each time the vehicle containing the clutch is started and stopped. Thus, each time it stops, a predetermined amount of fluid drains from the reservoir 81 into the clutch 10 insuring that sufficient fluid is present for the pitot tube pump to initiate and thereafter maintain flow for proper performance of the clutch.

While a control valve assembly of a particular and effective shape has been shown and described by way of illustration, it is not our intent or desire to unnecessarily restrict the improvement by this limited showing. For example, the piston in the control valve could be replaced by a diaphragm providing the same function for the valve.

We claim:

1. In a liquid cooled friction clutch system including a rotatable driving member connected to a prime mover, a driven member adapted to be connected to an output shaft, friction surfaces carried by said driven member, a cover plate assembly connected to said driving member, a housing enclosing said driving and driven members, pressure applying means drivingly associated with said cover plate assembly and adapted to place said driven member into engagement with said driving member, resilient means associated with said pressure applying means adapted to normally urge said driving and driven members into engagement, a non-rotatable support member carried by said housing, non-rotatable releasing means coaxial with said output shaft and axially slidable on said non-rotatable support member, said releasing means adapted to disengage said driving and driven members, and pumping means comprising a fluid conduit having an inlet end in communication with an inner periphery of said cover plate assembly and an outlet end connected to said releasing means, a first fluid conduit from said pumping means and a second fluid circuit leading to said friction surfaces, the improvement comprising a fluid reservoir interposed between said first and second fluid circuits and receiving cooling fluid from said pumping means and first fluid circuit, valve means communicating with said reservoir, a standpipe extending upwards into said reservoir and terminating short of the upper end thereof to define the static fluid level in said reservoir, said valve means including an inlet chamber communicating with said first fluid circuit and said standpipe, an outlet chamber communicating with said reservoir and said second fluid circuit, and a by-pass orifice which connects the lower end of the standpipe to said outlet chamber to allow priming of said pumping means by return of excess fluid from the reservoir through the standpipe.

2. A liquid cooled friction clutch system as set forth in claim 1, wherein the fluid level in said reservoir during pumping action rises above the level defined by said standpipe, such that upon termination of pumping action the excess fluid above the end of the standpipe is returned to said cover plate assembly to prime said pumping means for the next initiation of pumping action.

3. A liquid cooled friction clutch system as set forth in claim 1, including means actuated by the pressure of the pumped fluid to actuate said valve means to allow full circulation of fluid through the clutch system.

4. A liquid cooled friction clutch system as set forth in claim 1, in which said valve means includes a valve seat defining an outlet from the reservoir and a resiliently-biased ball valve resting on said valve seat when fluid pressure in the system is below a predetermined value.

5. In a liquid cooled friction clutch system including a rotatable driving member connected to a prime mover, a driven member adapted to be connected to an output shaft, friction surfaces carried by said driven member, a cover plate assembly connected to said driving member, a housing enclosing said driving and driven members, pressure applying means drivingly associated with said cover plate assembly and adated to place said driven member into engagement with said driving member, resilient means associated with said pressure applying means adapted to normally urge said driving and driven members into engagement, a non-rotatable support member carried by said housing, non-rotatable releasing means coaxial with said output shaft and axially slidable on said non-rotatable support member, said releasing means adapted to disengage said driving and driven members, and pumping means comprising a fluid conduit having an inlet end in communication with an inner periphery of said cover plate assembly and an outlet end connected to said releasing means, a first fluid circuit from said pumping means and a second fluid circuit leading to said friction surfaces, the improvement comprising a fluid reservoir interposed between said first and second fluid circuits and receiving cooling fluid from said pumping means and first fluid circuit, valve means communicating with said reservoir, a standpipe extending upwards into said reservoir and terminating short of the upper end thereof to define the static fluid level in said reservoir, and means actuated by the pressure of the pumped fluid to actuate said valve means to allow full circulation of fluid through the clutch system, said valve means including a valve seat defining an outlet from the reservoir, a resiliently biased ball valve resting on said valve seat when fluid pressure in the system is below a predetermined value, a fluid inlet communicating with said first circuit and said standpipe, said valve means having an outlet cavity communicating with said valve seat and said second fluid circuit and a by-pass orifice extending between said standpipe and said outlet cavity and adapted to be closed by actuation of said valve actuating means.

6. A liquid cooled friction clutch system as set forth in claim 5, in which said valve means includes a valve body having a chamber between said inlet and said outlet cavity and housing said valve actuating means, said chamber communicating with said standpipe and said by-pass orifice.

7. A liquid cooled friction clutch system as set forth in claim 6, in which said valve actuating means includes an inverted cup-shaped piston in said last-mentioned chamber and an extension on said piston adapted to engage and unseat said ball valve upon upward movement of said piston in said chamber.

8. A liquid coled friction clutch system as set forth in claim 7, in which said valve body includes a passage communicating with said standpipe and spaced from said chamber and outlet cavity by a wall, said wall having an opening adjacent its lower end extending between said chamber and said passage, and said orifice being spaced from said opening and extending through said wall between said passage and said chamber.

9. A liquid cooled friction clutch assembly as set forth in claim 8, in which said orifice slants downwardly from said passage to said chamber.

10. A liquid cooled friction clutch assembly as set forth in claim 8, in which said piston has a lower end allowing limited flow of fluid thereunder when in its lowermost position in said chamber.

11. A liquid cooled friction clutch assembly as set forth in claim 5, including a valve cage at the lower end of the reservoir and defining said valve seat, said ball valve being housed in said cage, and a compression spring in said cage urging said ball valve against said valve seat.

12. A fluid circulating system for a liquid cooled friction clutch having pumping means therein, comprising a first fluid circuit communicating with the pumping means in the clutch, a second fluid circuit delivering cooling fluid to the clutch, a fluid reservoir interposed between said first and second fluid circuits and receiving cooling fluid from the pumping means, valve means communicating with said first and second fluid circuits and said reservoir and a standpipe connected to said valve means and extending upwards into said reservoir and terminating therein to define the static fluid level in the reservoir, said valve means including an inlet communicating with said first fluid circuit and said standpipe, an outlet communicating with said reservoir and said second fluid circuit, and a by-pass orifice which connects the bottom of the standpipe to said outlet to allow passage of excess fluid from the reservoir through the standpipe to the clutch for priming of the pumping means.

13. A fluid circulating system as set forth in claim 12, including a valve seat at the bottom of said reservoir communicating with said outlet, a resiliently biased valve member normally resting on the valve seat, and valve actuation means adapted to unseat said valve member when a predetermined pumping pressure is exceeded.

14. A fluid circulating system as set forth in claim 12, in which an air cavity is defined in said reservoir above the fluid level therein, said fluid level rising above the end of the standpipe during pumping action so that upon termination of the pumping action, the excess fluid above the end of the standpipe is returned to said clutch to prime the pumping means for the next initiation of pumping action.

15. A fluid circulating system as set forth in claim 13, in which said valve actuation means includes an inverted cup-shaped piston in said inlet having a projection adapted to engage and unseat said valve member, said piston covering said by-pass orifice when pumping pressure is sufficient to unseat the valve member.

16. A fluid circulating system as set forth in claim 12, in which said valve means has a chamber connected to said inlet and a passage communicating with said standpipe, and a wall separating said chamber and said passage and having an opening adjacent the lower end connecting said passage with said chamber to allow flow from said inlet to said standpipe.

17. A fluid circulating system for a liquid cooled friction clutch having pumping means therein, comprising a first fluid circuit communicating with the pumping means in the clutch, a second fluid circuit delivering cooling fluid to the clutch, a fluid reservoir interposed between said first and second fluid circuits and receiving cooling fluid from the pumping means, valve means communicating with said first and second fluid circuits, a standpipe extending upwards into said reservoir and terminating therein to define the static fluid level in the reservoir, said valve means including a valve body having an inlet communicating with said standpipe and an outlet communicating with the lower end of said reservoir, said valve body having a chamber connected to said inlet and a passage communicating with said standpipe, a wall separating said chamber and said passage and having an opening adjacent the lower end connecting said passage with said chamber to allow flow from said inlet to said standpipe, a by-pass orifice positioned in said wall spaced from said opening and communicating between the standpipe and the outlet to allow passage of excess fluid from the reservoir to said clutch for priming of the pumping means, a valve seat at the bottom of said reservoir communicating with said outlet, a resiliently-biased valve member normally resting on the valve seat, and valve actuation means adapted to unseat said valve member when a predetermined pumping pressure is exceeded, said valve actuation means allowing flow through said orifice when there is no pumping pressure and blocking said orifice when pumping pressure exceeds the predetermined value.

18. A fluid circulating system for a liquid cooled friction clutch having pumping means therein, comprising a first fluid circuit communicating with the pumping means in the clutch, a second fluid cicuit delivering cooling fluid to the clutch, a fluid reservoir interposed between said first and second fluid circuits and receiving cooling fluid from the pumping means, valve means communicating with said first and second fluid circuits, a standpipe extending upwards into said reservoir and terminating therein to define the static fluid level in the reservoir, said valve means including a valve body having an inlet communicating with said standpipe and an outlet communicating with the lower end of said reservoir, a by-pass orifice communicating between the standpipe and the outlet to allow passage of excess fluid from the reservoir to said clutch for priming of the pumping means, said valve body having a chamber connected to said inlet and a passage communicating with said standpipe, a wall separating said chamber and said passage and having an opening adjacent the lower end connecting said passage with said chamber to allow flow from said inlet to said standpipe, a valve seat at the bottom of the reservoir communicating with said outlet, a resiliently-biased valve member normally resting on the valve seat, and valve actuation means adapted to unseat said valve member when a predetermined pumping pressure is exceeded and including an inverted cup-shaped piston located for movement within said chamber, and a projection on the upper end of the piston adapted to engage an unseat said valve member upon upward movement of said piston.

19. A fluid circulating system as set forth in claim 18, in which said orifice is located in said wall and communicates between said passage and said chamber, said piston in its lowermost position allowing flow through said orifice to said outlet and, when the piston is raised in said chamber by pumping pressure, closing said orifice.

20. A fluid circulating system as set forth in claim 19, in which the lower edge of said piston partially blocks said opening and allows partial flow therethrough when the piston is in its lowermost position; said piston edge providing an opening between said chamber and said first mentioned opening.

21. A fluid circulating system as set forth in claim 20, in which said orifice is downwardly slanted from said passage to said chamber and, when the piston is in its lowermost position, reverse flow is allowed for excess fluid in said reservoir through said opening in said wall, said opening defined by the piston lower edge and said chamber and inlet to said first fluid circuit.

22. A fluid circulating system as set forth in claim 18, in which said valve body has an outlet cavity above and opening into said chamber and communicating between said valve seat and said outlet, a valve cage mounted at the lower end of said reservoir and defining said valve seat and a spring housed in said cage, said valve member comprising a ball valve positioned with said cage and below said spring, said cage having openings communicating with the interior of said reservoir.

* * * * *

UNITED STATES PATENT OFFICE
CERTIFICATE OF CORRECTION

PATENT NO. : 3,964,587
DATED : June 22, 1976
INVENTOR(S) : TING M. WANG and WALTER H. RICHARDSON It is certified that error appears in the above-identified patent and that said Letters Patent are hereby corrected as shown below:

Column 3, line 32 change "over" to -- cover --.

Column 4, line 8, change "coler" to -- cooler --.

Column 7, line 1 of Claim 8, change "coler" to -- cooler --.

Signed and Sealed this

Seventh Day of September 1976

[SEAL]

Attest:

RUTH C. MASON
*Attesting Officer*

C. MARSHALL DANN
*Commissioner of Patents and Trademarks*